Oct. 12, 1943.  E. A. ROCKWELL  2,331,800
SYSTEM FOR CONTROLLING THE APPLICATION OF POWER
Filed Jan. 4, 1940  12 Sheets-Sheet 1

Fig. 1.

INVENTOR
Edward A. Rockwell
BY
Arthur Wright
ATTORNEY

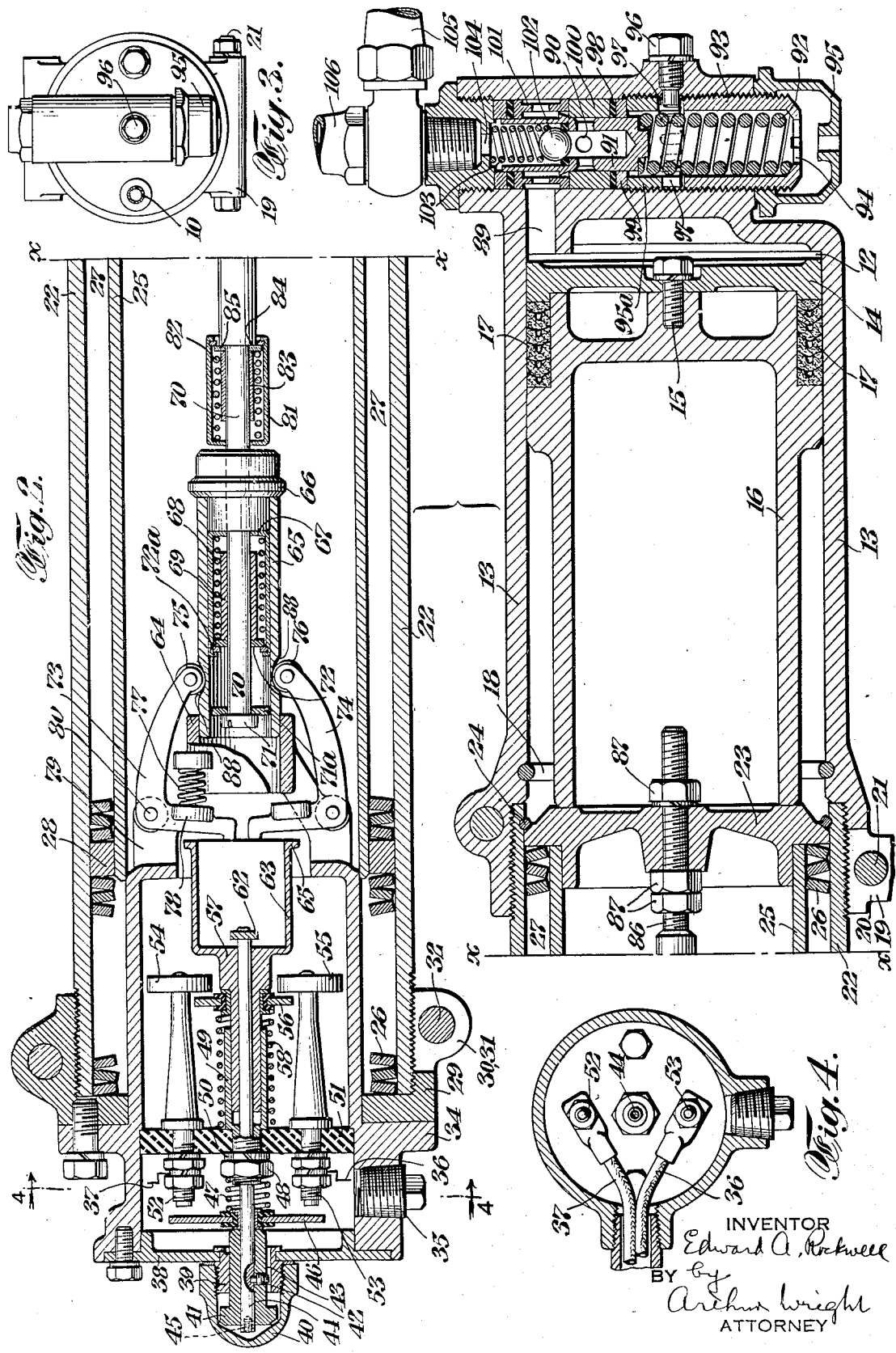

Oct. 12, 1943. E. A. ROCKWELL 2,331,800
SYSTEM FOR CONTROLLING THE APPLICATION OF POWER
Filed Jan. 4, 1940 12 Sheets-Sheet 3
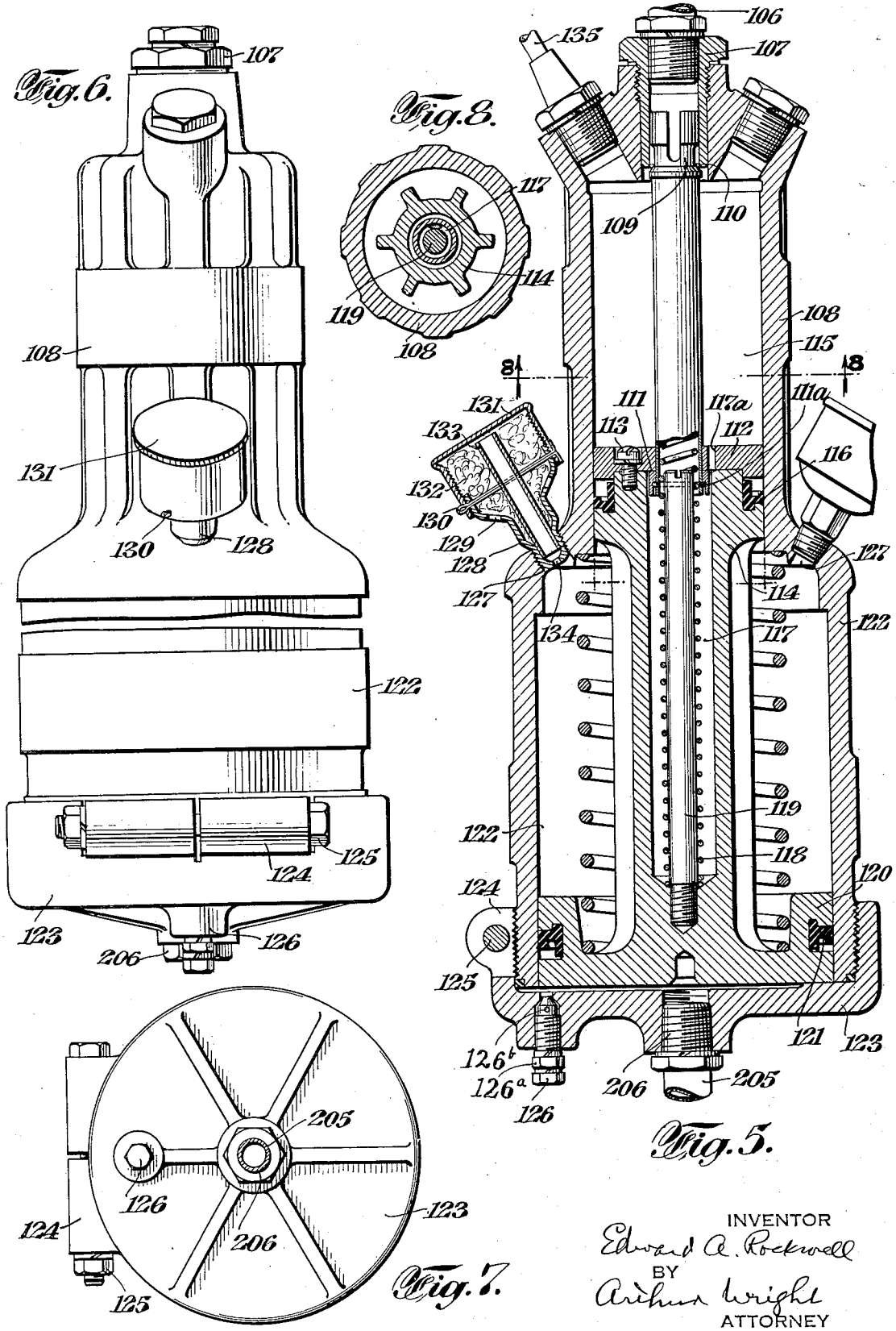

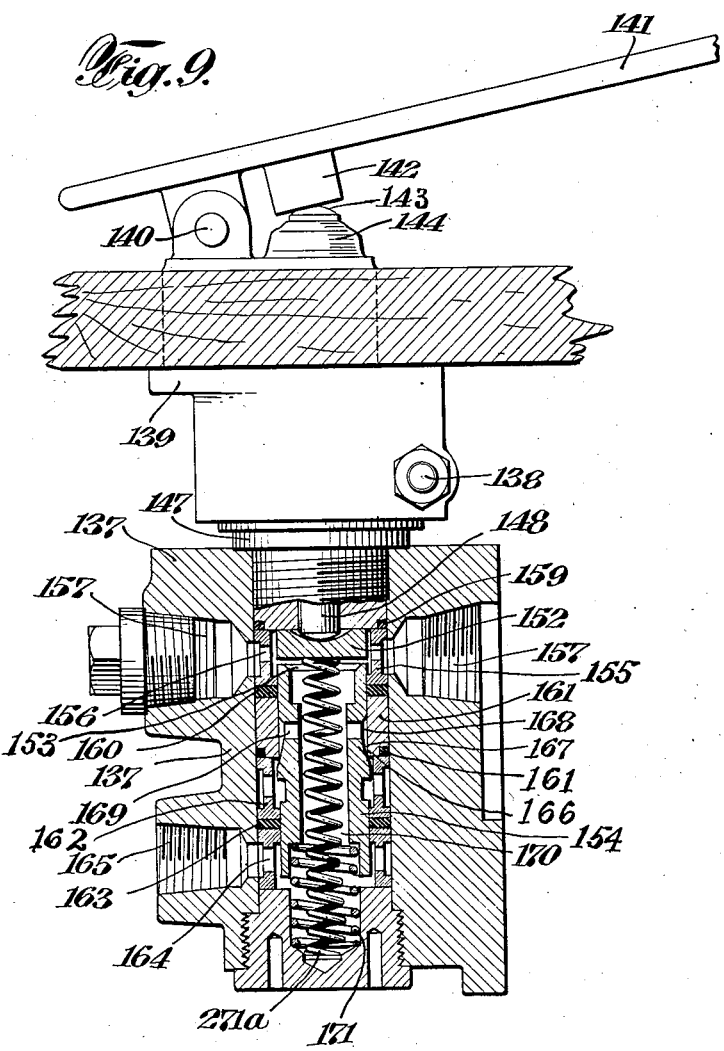

Oct. 12, 1943.  E. A. ROCKWELL  2,331,800
SYSTEM FOR CONTROLLING THE APPLICATION OF POWER
Filed Jan. 4, 1940  12 Sheets-Sheet 5
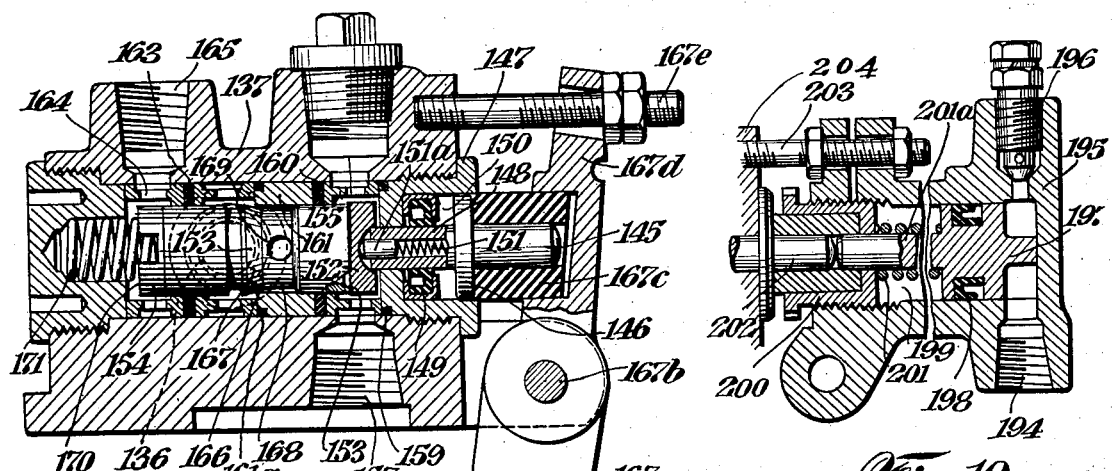
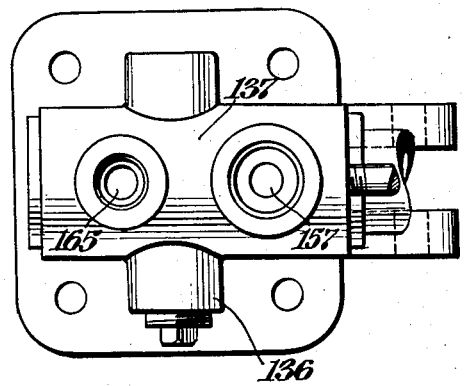
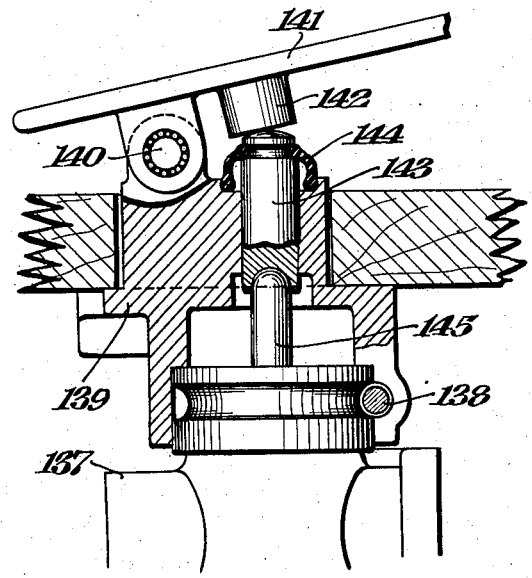
INVENTOR
Edward A. Rockwell
BY
Arthur Wright
ATTORNEY

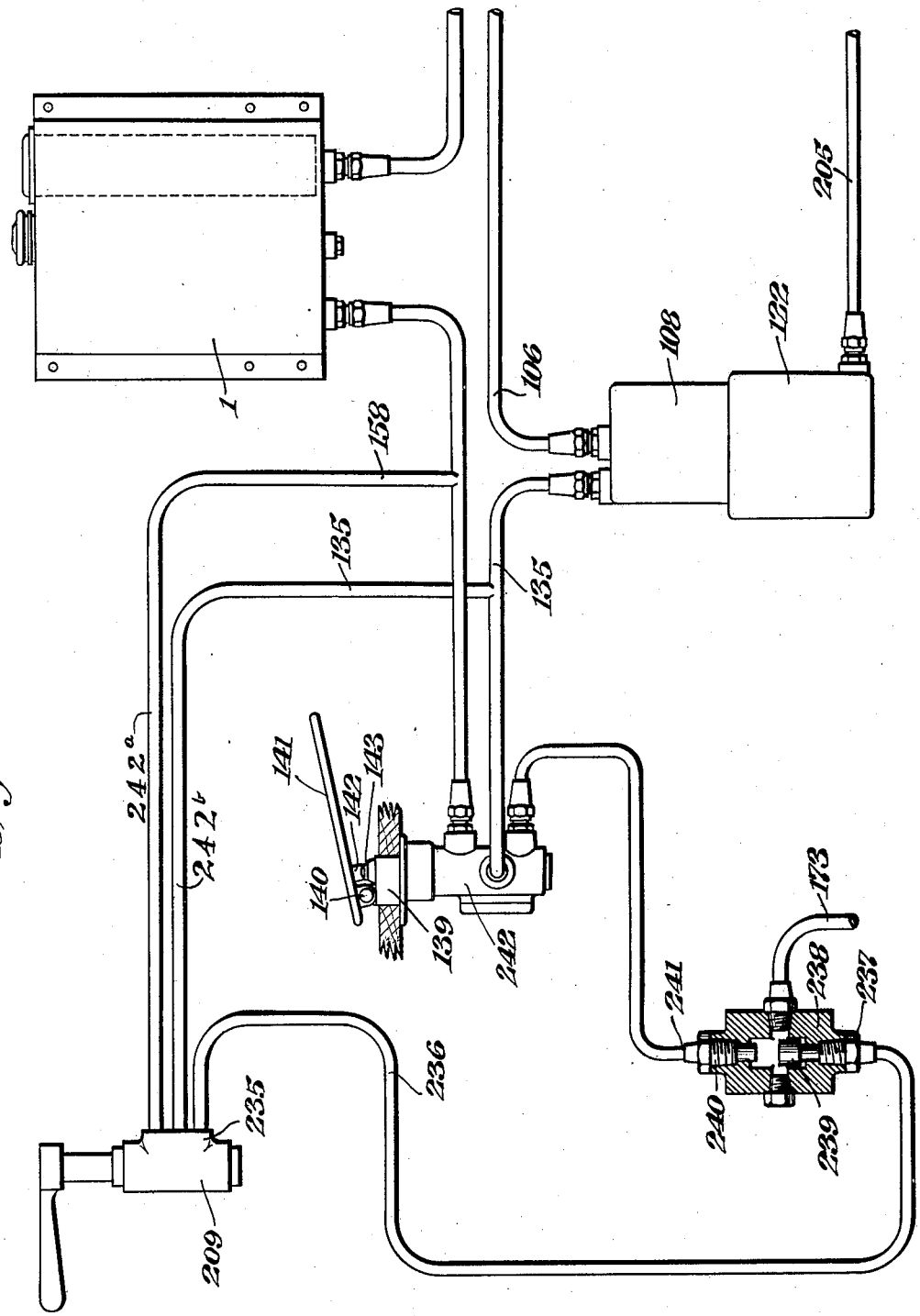

Oct. 12, 1943.  E. A. ROCKWELL  2,331,800
SYSTEM FOR CONTROLLING THE APPLICATION OF POWER
Filed Jan. 4, 1940  12 Sheets-Sheet 7
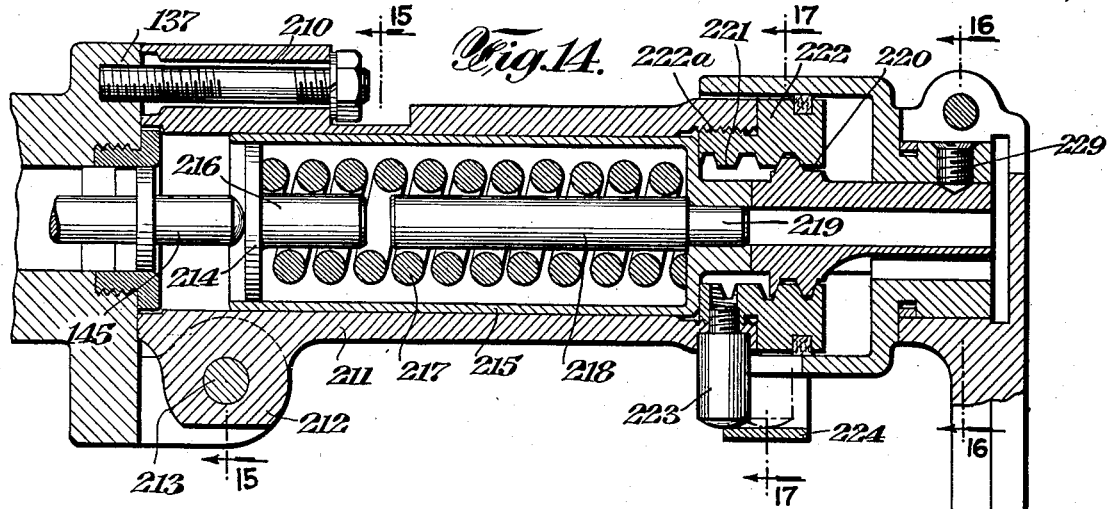
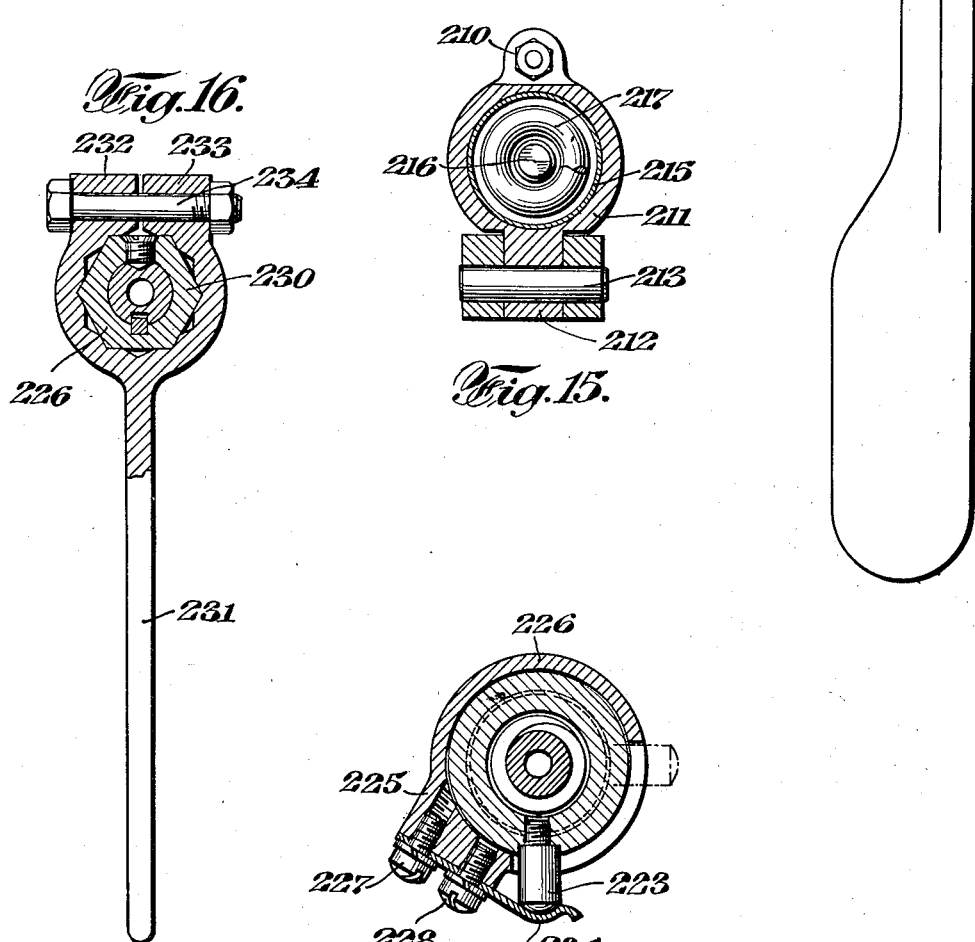
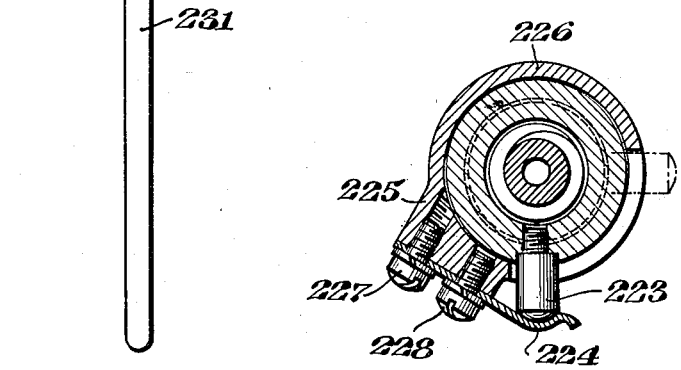
INVENTOR
Edward A. Rockwell
BY
Arthur Wright
ATTORNEY

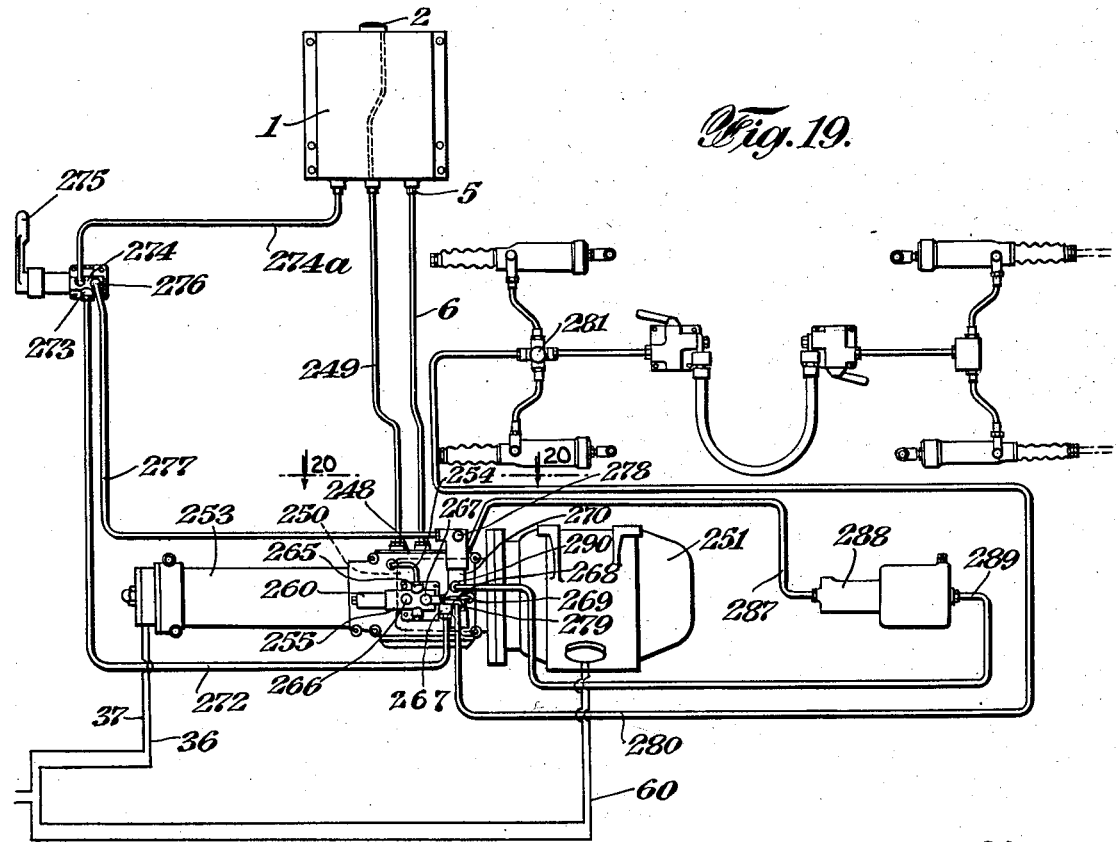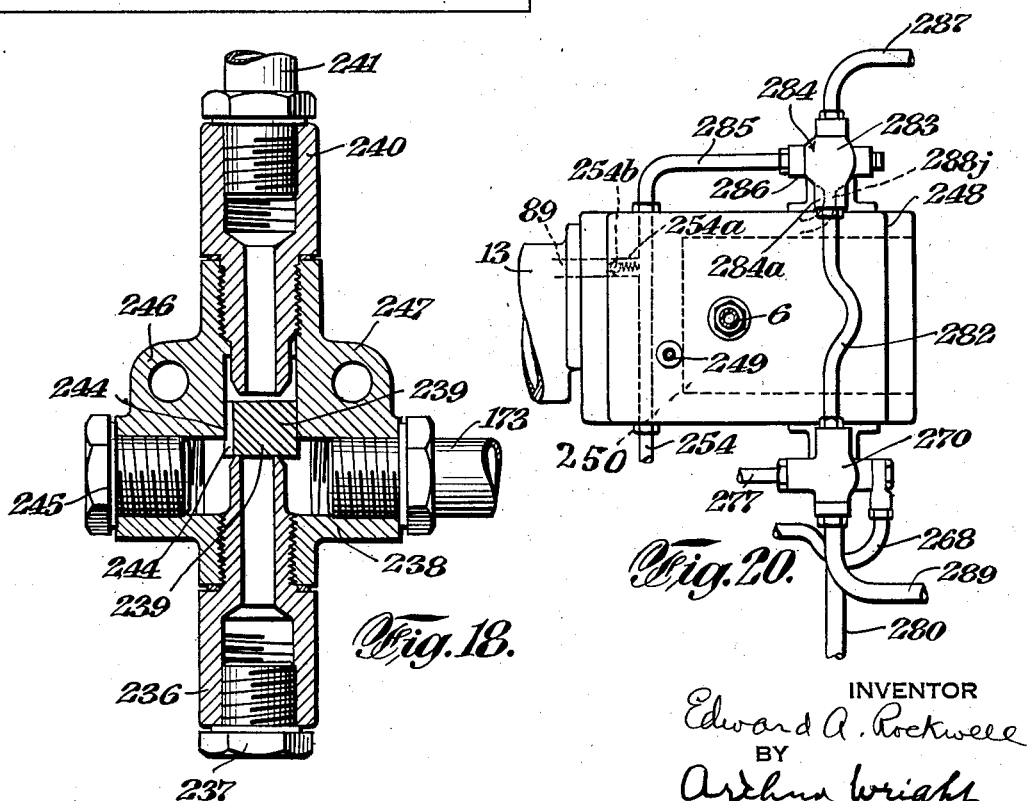

Oct. 12, 1943.  E. A. ROCKWELL  2,331,800
SYSTEM FOR CONTROLLING THE APPLICATION OF POWER
Filed Jan. 4, 1940  12 Sheets-Sheet 9

INVENTOR
Edward A. Rockwell
BY
Arthur Wright
ATTORNEY

Oct. 12, 1943.   E. A. ROCKWELL   2,331,800
SYSTEM FOR CONTROLLING THE APPLICATION OF POWER
Filed Jan. 4, 1940   12 Sheets-Sheet 10
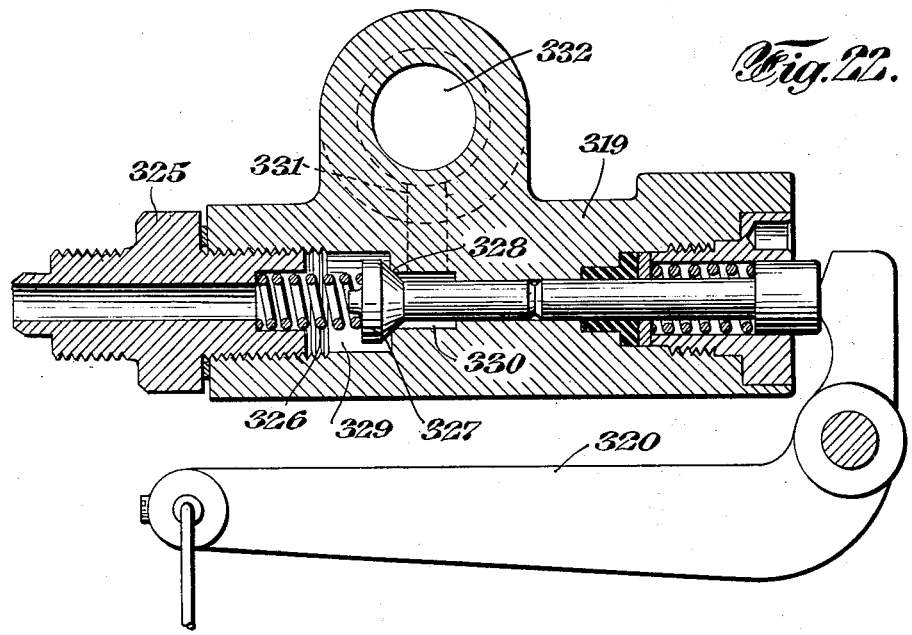
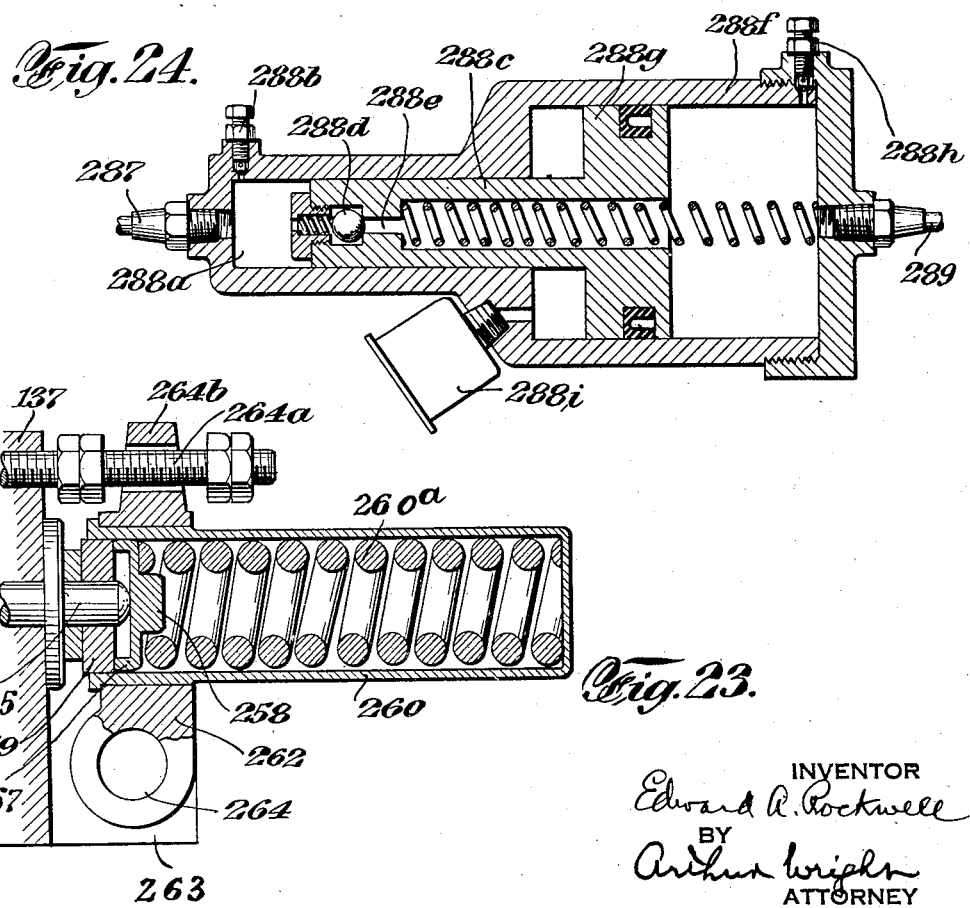
INVENTOR
Edward A. Rockwell
BY
Arthur Wright
ATTORNEY Oct. 12, 1943.	E. A. ROCKWELL	2,331,800
SYSTEM FOR CONTROLLING THE APPLICATION OF POWER
Filed Jan. 4, 1940	12 Sheets-Sheet 12

INVENTOR
Edward A. Rockwell
BY Arthur Wright
ATTORNEY

Patented Oct. 12, 1943

2,331,800

UNITED STATES PATENT OFFICE 2,331,800

SYSTEM FOR CONTROLLING THE APPLICATION OF POWER

Edward A. Rockwell, Forest Hills, N. Y., assignor to The New Britain Machine Company, New Britain, Conn., a corporation of Connecticut Application January 4, 1940, Serial No. 312,356

13 Claims. (Cl. 60—54.5)

My invention relates particularly to an apparatus designed for controlling the application of power for the operation of different parts or accessories of automotive vehicles, as, for example, automobiles, aeroplanes, railroad cars, mine locomotives, etc.

The object of my invention is to provide a system whereby the different parts of automotive vehicles may be operated in an advantageous manner so as to maintain adequate control over the same at all times. Another object is to provide an apparatus of this character, in accordance with which the part to be operated may be moved into position initially by means of a fluid applied at one pressure, and thereafter operated to cause the performance of work by said part by fluid at another pressure, this being accomplished, if desired, by various differentials between the pressures applied for moving said part and the manual or actuating pressures utilized for controlling the pressures so applied. My invention is adapted to be applied, not only for the operation of heavy-duty parts, as, for instance, on heavy trucks, requiring a considerable volume of pressure fluid for the operation of the same but also for the operation of relatively light parts on aeroplanes and other automotive vehicles, such, for instance, as light trucks, etc. A further object of my invention is to provide an improved form of accumulator for accumulating fluid under a high pressure, and adapted to deliver the fluid therefrom at a constant uniform pressure, as desired. Another object is to provide an apparatus by means of which fluid at one pressure may be readily converted so as to supply fluid at a higher or lower pressure. Another object is to provide means whereby a constant regulated pressure may be obtained so as to obtain a fluid having a definite and constant supply pressure. A further object is to provide an improved form of modulator valve. Still another object is to provide an unloader valve. Another object is to provide a converter valve. Again, another object is to provide an effective means for the dual control of any of the operating parts, as, for instance, of an aeroplane, so that thereby a modulated operation manually at all times coordinate with the reaction of the operated part, may be obtained. Further objects of my invention will appear from the detailed description of the same hereinafter.

While my invention is capable of embodiment in many different forms, I have shown only certain embodiments thereof in the accompanying drawings, in which—

Fig. 1 is a diagrammatic elevation of a system made in accordance with my invention, adapted for heavy duty, involving the application of a modulated low pressure and so as to apply thereafter a modulated high pressure;

Fig. 2 is a vertical section of an accumulator for pressure adapted to be used therewith;

Fig. 3 is an end elevation of the same;

Fig. 4 is a vertical section through the same on line 4—4 of Fig. 2;

Fig. 5 is a vertical section of a pressure converter adapted to be used therewith;

Fig. 6 is an elevation of the same;

Fig. 7 is a plan view of the same;

Fig. 8 is a cross-section of the same taken on line 8—8 of Fig. 5;

Fig. 9 is a longitudinal section of one of the modulator valves;

Fig. 10 is a vertical section of a converter valve;

Fig. 11 is a plan view of an upper portion of the manual valve control casing;

Fig. 12 is a vertical section through the same;

Fig. 13 is a modified form of my invention showing the same as applied to the dual control of an aerolane, etc.;

Fig. 14 is a longitudinal section of a hand control valve used therein;

Figure 21:
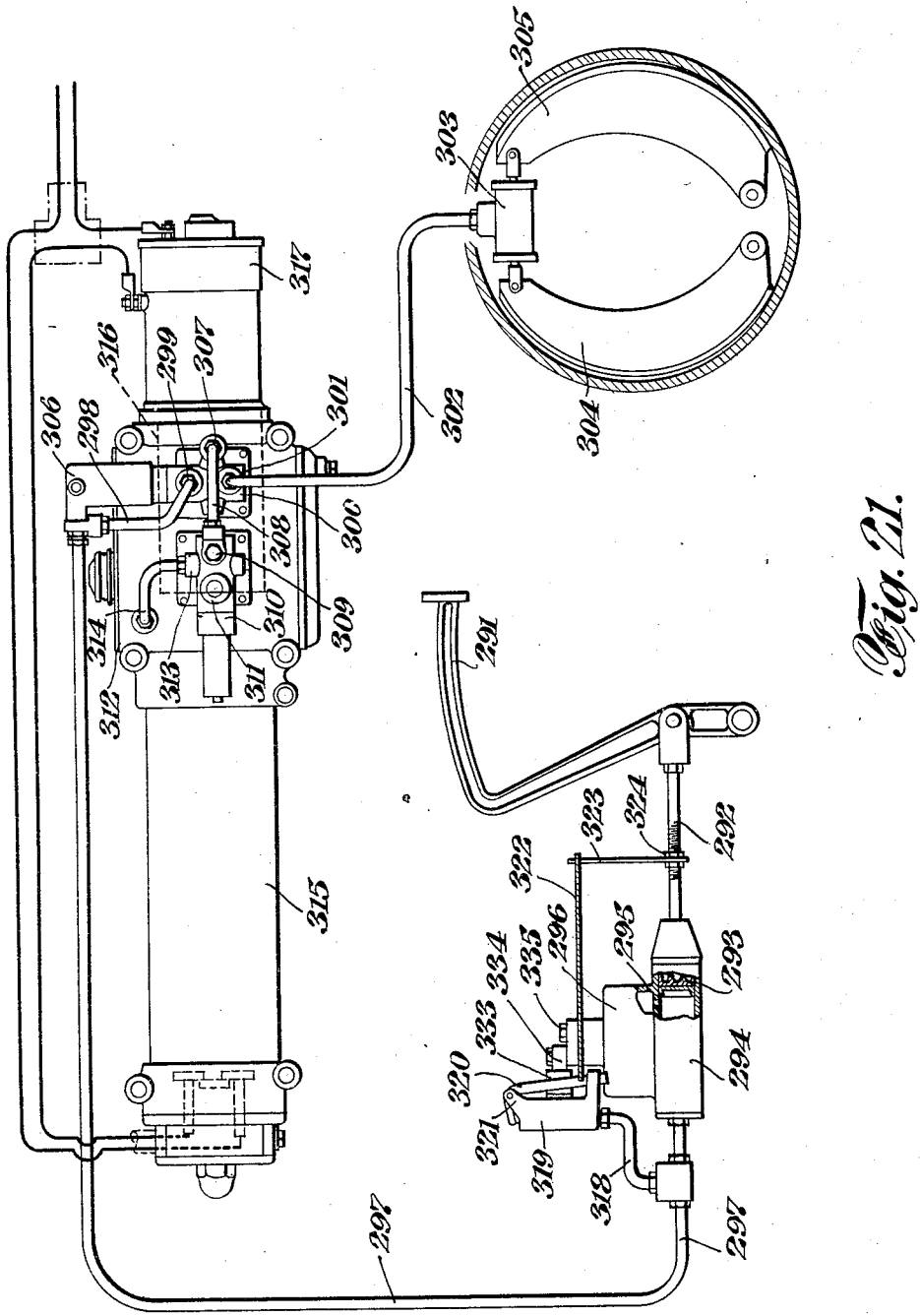

Figs. 15, 16 and 17 are transverse sections through the same on lines 15—15, 16—16 and 17—17;

Fig. 18 is a transverse section of the two-way valve used therein;

Fig. 19 is an elevation of a modified form of the system involving the manual application of high pressure to apply thereby a modulated low and then a high pressure;

Fig. 20 is a plan view of a detail thereof;

Fig. 21 is an elevation of a further modification of the system in which a manual fluid pressure is provided for thereafter applying a modulated higher pressure;

Fig. 22 is a longitudinal section of an unloader valve used therewith;

Fig. 23 is a longitudinal section of the regulator valve used in connection with the form shown in Fig. 19;

Fig. 24 is a transverse section of a converter from high to low pressure used in Fig. 19.

Fig. 25 is a modified form of hand actuated modulator valve.

Figure 26:
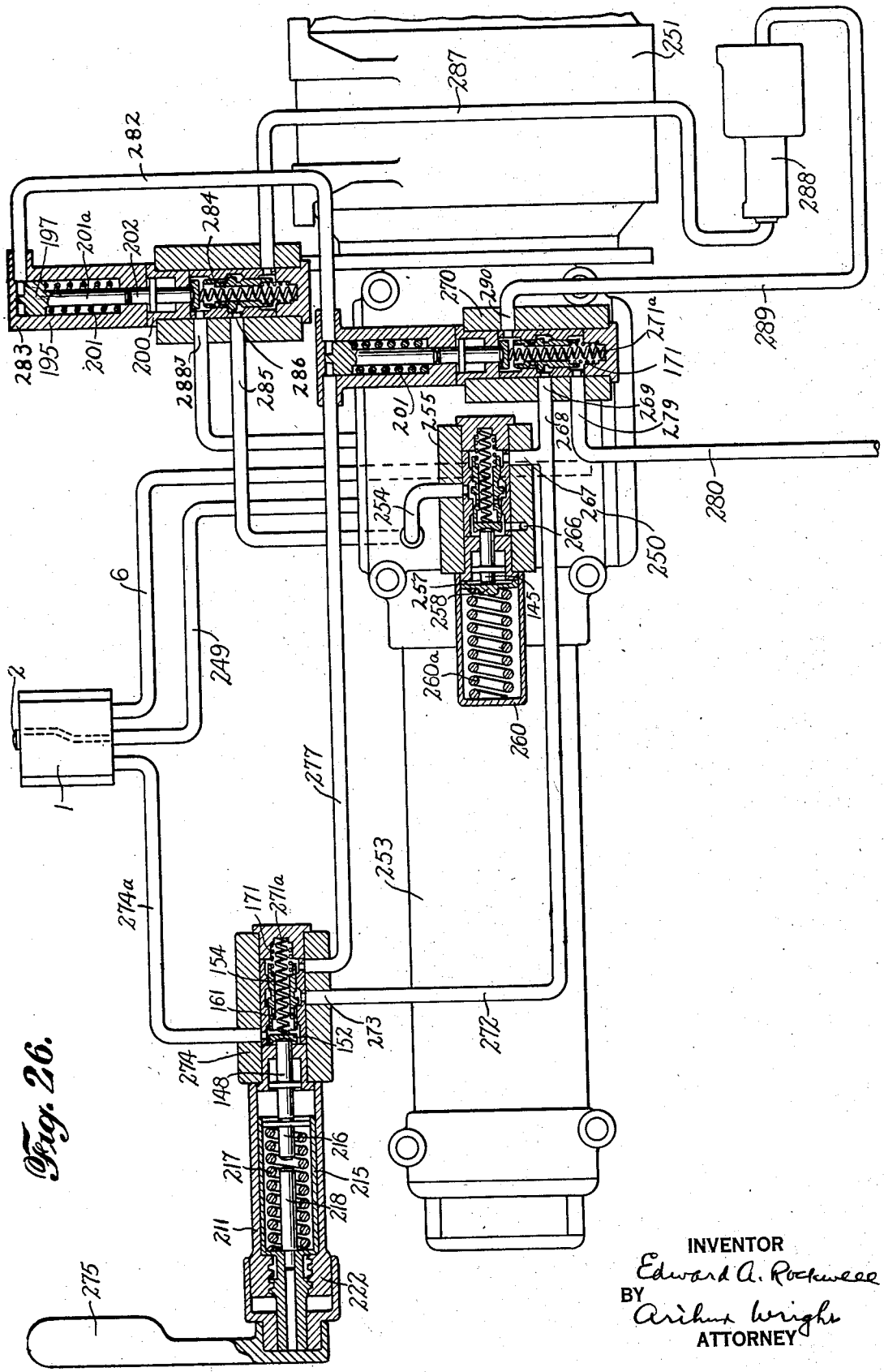

Fig. 26 is a diagrammatic representation of the circuit in Fig. 19; and

Figure 27:
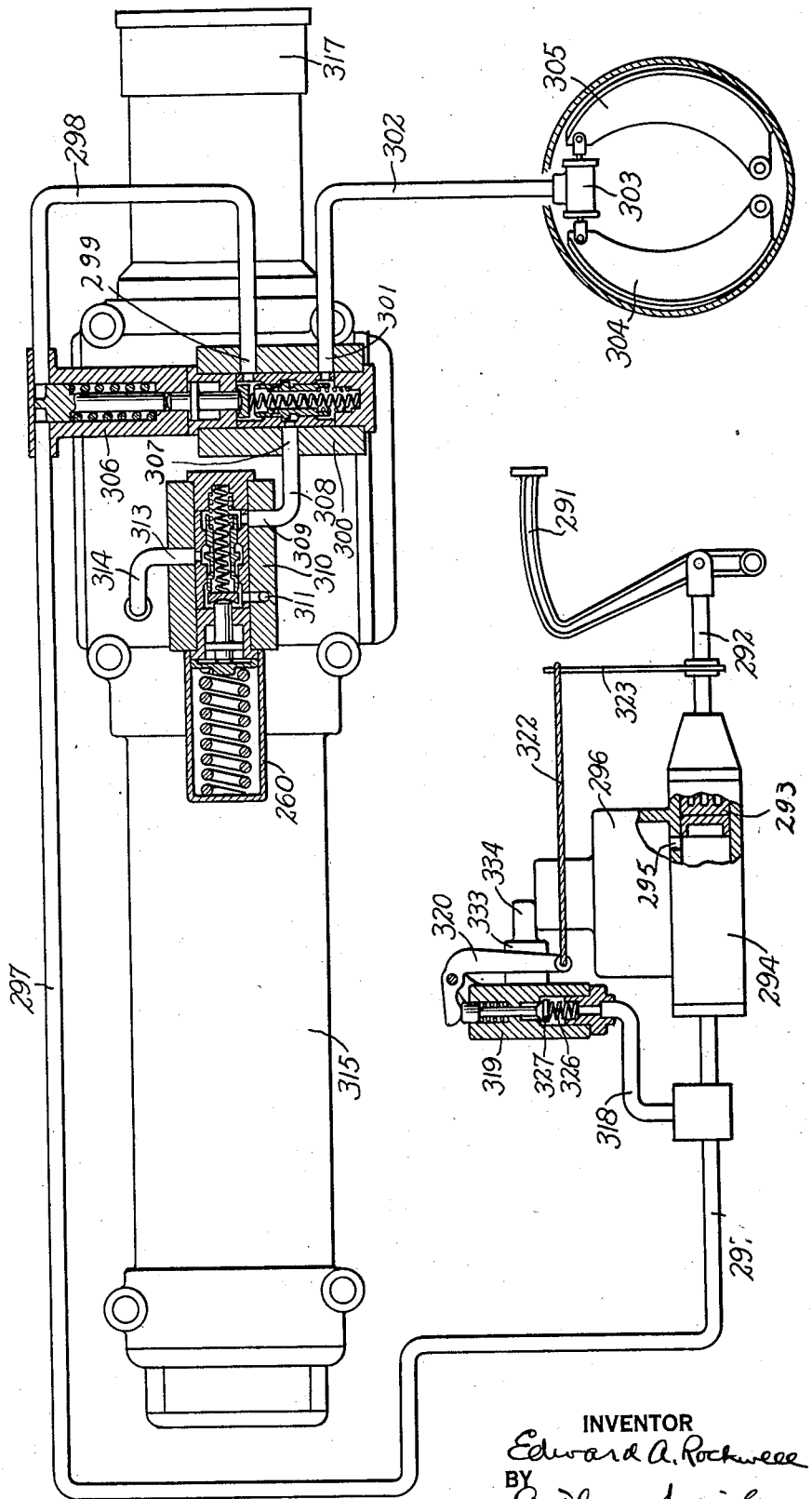

Fig. 27 is a diagrammatic representation of the circuit shown in Fig. 21.

Referring first to the form of my invention shown in Fig. 1, a system is provided for first applying a modulated low pressure and for thereafter controlling the application of a modulated high pressure thereby.

There is provided therein a reservoir gravity-feed tank 1 having a filler opening 2, an inlet 3 for the returned discharged liquid, which may be a hydraulic brake fluid or any other suitable liquid, and a removable cylindrical screen filter 4 located over an outlet or supply opening 5 which leads by a pipe 6 to a rotary pump 7 which may, for example, be any desired type of gear pump. This is driven by an electric motor 8.

Pressure liquid is thus supplied from the pump 7 by a pipe 9 to an inlet 10 on a pressure accumulator 11. The pressure fluid from the pump 8 is thus received in a chamber 12 in a cylinder 13 so as to force to the left in Fig. 2, a piston 14 which is mounted by means of a screw 15 on a plunger 16 between which piston 14 and plunger 16 there is a chevron packing 17, of suitable material. A snap ring stop 18 for the plunger 16 is located at the left of the cylinder 13, which latter is screw-threaded, and provided with a pair of ears 19 and 20 secured together with a bolt 21, for screw-threaded attachment to a spring casing 22. The said plunger 16 rests against the face of a spring retainer plate 23. The spring casing 22 also has a split ring stop 24 for the retainer plate 23, which is also provided with an internal sleeve 25 to act as a guide for a plurality of Belleville spring washers 26 which are merely dished rings of spring steel. As shown in the drawings, the said rings 26 are located so that the adjacent rings have their dished portions extending in opposite directions, said rings being thus carried in an annular chamber 27 between the casing 22 and the guide 25 at intervals along the chamber 27. Between groups of the spring washers 26 there are ring-shaped blocks 28 to aid in maintaining the alignment of the spring washers 26. The left end of the chamber 27 is closed by a screw-threaded cap 29, having a pair of ears 30 and 31, screw-threaded to the spring casing 22 and clamped together by a bolt 32. Bolted to the left face of the cap 29 there is a cylindrical switch housing 34, which extends inwardly within the washers 26, the same having a removable screw-plug 35 to permit access to the switch terminals for leads 36 and 37 leading to the switch terminals. A cover plate 38 is bolted to the switch housing 34. In said cover plate 38 there is a sleeve 39 having a screw-threaded cap 40 to hold in place a sleeve 41 which has a screw 42 adapted to be received in a slot 43 in the sleeve 39. Said screw 42 also fastens in position an adjustable switch supporting rod 44 provided with a screw-threaded hole 45 to aid in the removal thereof. Slidably mounted on the rod 44 there is a copper plate 46 which operates as a starting switch in the initial starting or setting of the switch apparatus, said plate 46 being normally held in its farthest position to the left by a light spring 47. The other end of said spring 47 abuts against a nut 48 on a sleeve 49 carried on the rod 44, said nut 48 having a washer 50 spacing it from an insulated ring 51 carried on the sleeve 49 and which supports two rod-shaped terminals 52 and 53 connected to said leads 37 and 36 respectively. The copper plate 46 is designed to initially close the circuit manually between the said two rods 52 and 53. The right-hand end of the rods 52 and 53 have screw-threaded thereto conducting plates 54 and 55 which are designed, in the automatic operation of the apparatus, to close the circuit with a copper disk 56 carried on a circuit-breaker sleeve 57 slidable within the sleeve 49 and normally held towards the right in Fig. 2 by a spring 58 to close the said circuit. It will be noted that the lead 36 is connected to one terminal 59 at one side of the motor 8 and the other lead 37 leads to any suitable source of electrical energy, as, for example, a battery, not shown, which latter is also connected by a lead 60 to a terminal 61 on said motor. The right-hand end of the rod 44 has a stop 62 cooperating with the interior of a shell 63 which is formed on the end of the circuit-breaker sleeve 57. This shell 63 is adapted to be moved for the automatic making and breaking of the pumping circuit by a ring 64 mounted on a cylindrical member 65 carrying within the same a snap action circuit breaking member 66, the inner left portion of which rests against a spring housing 67, having a spring 68 within the same carried on the outside of a sleeve 69 which overlies a rod 70, having a headed screw 71 and a washer 71a supporting near one end thereof a washer 72 held in place by a snap ring 72a to retain said spring 68 in place.

The said snap action circuit breaking member 66 cooperates with two bell-crank levers 73 and 74 having rollers 75 and 76 thereon, which latter are forced against the face of the cylindrical member 65 by springs 77, resting against extensions 78 on arms 79 on which the bell-crank levers 73 and 74 are carried by means of pivots 80. The arms 79 form a part of the switch housing 34. The rod 70, after passing through the snap action member 66, at the right thereof, carries a spring sleeve 81 having therein a spring 82 supported on a sleeve member 83 around the rod 70, which latter has a shoulder 84 supporting an end washer 85 to act as a retainer for said spring 82. The right-hand end of the rod 70 has a screw-thread 86 which is secured within the spring retainer plate 23 by means of nuts 87. Notches 88 in the face of the cylindrical member 65 also cooperate with said rollers 75 and 76 so as to retain the pump circuit broken when the pressure-liquid line is broken, that is to say when the piston 14 is at the extreme right-hand end of the cylinder 13. However, when the said liquid line is complete and the pump motor has been started manually by moving the copper plate 46 to the right, the pump will be started to supply the pressure liquid therefrom to the cylinder 12 and the piston 14 will move to the left, accordingly, until the snap action circuit-breaker 66 breaks the circuit when the desired pressure has been accumulated, so that, thus, liquid is supplied from the cylinder 12 through a port 89 and thence through radial ports 90 in a valve sleeve 91 which is normally kept in elevated position by means of a spring 92 carried in a cage 93 screw-threaded into the end of the cylinder 13. The lower end of the cage 93 has a slotted opening 94 to permit removal thereof, the same being covered with a screw-threaded apertured dust cap 95. Above the cage 93 there is a screw sleeve 95a, the adjusted position of the sleeve being maintained by a screw 96 cooperating with a series of slots 97 in said sleeve. This adjustment of the sleeve 95a also permits the tightening of an annular seal 98 located above a washer 99, the seal 98 being supported on the other face thereof by a spacing member 100 which rests against an apertured sleeve 101 within which the valve member 91 slides. A check valve 102 is carried within the valve member 91 and is held on its seat by a spring 103. The pressure liquid which is thus supplied by the force from the piston 14 is discharged past the check valve 102 and thence to a discharge port 104 leading to a pipe 105, this discharged pressure being a uniform pressure, preferably of about 500 lbs. per square inch.

Another discharge pipe 106 conveys the pressure liquid at this same pressure from the discharge port 104 to a fitting 107 in the upper end of a low-to-high pressure converter 108, Fig. 5, which fitting 107 also acts as a guide for a valve stem 109 of a valve 110 which is initially in its open position in the first part of the operation of the automotive accessory to be operated by the pressure liquid. This open position of the valve 110 is insured by a shoulder member 111 held in place by a snap ring 111a on the lower end of said valve, which shoulder member cooperates with the rear face of a plunger 112 secured by screws 113 to a piston 114 which operates within a cylinder 115 in the upper part of the low pressure converter 108. A sealing ring 116 is located between the plunger 112 and the piston 114. Thus the lower end of the valve 110 is adapted to move within a cylindrical chamber 117 within the piston 114, having a communication port 117a with the cylinder 115, the shoulder member 111 being normally held in its upper position by a spring 118 to seat the valve 110 and located around a guide-rod 119 screw-threaded within the piston 114 at the lower end thereof. The lower end of said piston 114 carries a large piston 120 and a sealing ring 121 which operate within an enlarged cylinder 122, the lower end of which is closed by a screw-threaded cap 123 having clamping ears 124 held together with a bolt 125. A normally closed air bleeder screw 126 is carried in the lower face of the cap 123 and is removable from the screw 126a having an air escape port 126b to permit the escape of air. At the upper end of the enlarged cylinder 122 there are a plurality of breather openings 127. Each of these openings 127 carries a screw threaded shell 128 having an air port 129, said shell being secured by a screw-thread and cotter-pin 130 to a cover 131 filled with horsehair 132 so as to convey the filtered air therethrough to a tube 133 leading to an inlet port 134 and the cylinder 122. The pressure liquid thus passes through the normally open valve 110 to an outlet pipe 135 and thence to a high pressure inlet port 136 in a modulator valve having a casing 137. The said modulator valve casing 137, Fig. 9, has secured to the upper end thereof, by means of a locking screw 138, a pedal bracket 139 provided with a pivot 140 for a foot treadle 141. The said treadle 141 has a boss 142 on the lower face thereof which bears upon a plunger 143 in the pedal bracket 139 and is protected from access of dust by a rubber boot 144. The plunger 143, when the treadle 141 is depressed, is adapted to move downwardly a rod 145, Fig. 25, having a guide flange 146 for guiding it in a screw sleeve 147 carried in the end of the valve casing 137. On the other side of said flange 146 there is a plunger 148 provided with a seal 149, Fig. 25, supported in a chamber 150 in a part of the screw sleeve 147.

In one form of my invention, Fig. 25, a light spring 151 is located within the plunger 148 and bears at its other end, by means of a rod 151a, against a disk valve 152 which cooperates with a valve seat 153 on the end of a cylindrical modulator valve 154. The spring 151 keeps the valve disk 152 normally lightly closed to keep air from accumulating to the left of said valve 152.

Said modulator valve 154, Fig. 9, is slidable within a sleeve 155 having ports 156 communicating with a low pressure outlet port 157 connected by a pipe 158 to the reserve tank 1 by means of the port 3. An annular rubber seal 159 is provided between the sleeve 155 and the sleeve 147. Another annular seal 160 is located on the other side of the sleeve 155 adjacent to a metallic spacing member 161, adjacent to which there is a seal 161a and a ported sleeve 162 having a seal 163 communicating with the pressure liquid port 136. Adjacent to said seal 163 there is a ported sleeve 164 which leads to a modulated pressure port 165. It will be noted that the spacing member 161 has a valve seat 166 to cooperate with a conical valve 167 on the cylindrical valve 154. Also on the outside of said cylindrical valve 154 there is an annular recess 168 communicating with ports 169 therein leading to a longitudinal passageway 170 in the said valve 154. A strong spring 171 normally moves the cylindrical valve 154 to seat the valve 167 against its seat 166. The disk valve 152 is thus manually movable by the treadle 141 so that by first keeping the disk valve 152 closed manually on its seat 153 the cylindrical valve 154 may be moved downwardly, in Fig. 9, so as to open communication, past the valve 167, between the port 136 and the interior of said valve 154 and thence to the modulated pressure port 165. Instead of the pedal 141 I may use, as in Fig. 25, a hand lever 167a on a pivot 167b, to operate the rod 145 having a felt dust cover 167c, the lever 167a also having a stop arm 167d through which a stop rod 167e passes.

The modulated pressure thus passes from the port 165 by a pipe 173 to a tubular T-block 174 having one branch 175 leading to the brake actuation apparatus, and which may be comprised of two tubular connections 176 and 177 leading, respectively, to brake operating devices 178 and 179. Each of the latter carries a piston 180, in a cylinder 181, which is connected by a rod 182 to the brake shoes in the usual way, the cylinder 178 or 179 being connected with a bracket 183 fastened to the frame of the automobile. If desired, a further tubular connection 184 may branch rearwardly from the tubular connections 176 and 177, for connecting the same with a trailer, for which purpose there may be a manual shut-off valve 185 having a flexible tubular connection 186 leading to a manual shut-off valve 187 which in turn is provided with a tubular connection 188 leading to tubular branches 189 and 190 leading, respectively, to brake-operating units 191 and 192 constructed like the brake-operating units 178 and 179.

When the modulated pressure provided through the pipe 173 has moved the brake shoes into their position for applying thereafter the braking force, the pressure in the pipe 175 will rise and this pressure takes effect through a pipe 193 connected to the T-block 174 which leads to a port 194 in a fitting 195 of a converter valve having at the other side thereof a normally closed air bleeder 196, Fig. 10. Within the fitting 195 there is a plunger 197 having an annular seal 198 movable within a cylindrical chamber 199, the other end of which has a screw sleeve 200 to act as an abutment for a spring 201 which normally forces the plunger 197 to the right, in Fig. 10. A rod 201a on the left end of the plunger 197 passes through the screw sleeve 200 and bears on a rod 202 constructed the same and having parts and valve connections the same as the rod 145. This fitting 195 is secured by screws 203 to a valve casing 204 constructed exactly the same and provided with the same kind of valve as in the valve casing 137 previously described. In this instance the valve within the casing 204 is moved by the pressure accumulated within the pipe 193 so as to keep the said valve open during the continuance of said pressure and thus, at that time, to transmit the pressure fluid received from the pipe 105 through said valve and thence through a pipe 205 to a port 206 in the cap 123 of the low-to-high pressure converter 108.

The low pressure liquid discharged from the valve casing 204 when the high pressure within the pipe 193 ceases, is discharged by a pipe 207 through a port 208 on the inlet side of the pump 7, which is also connected to the pipe 6. In this way, when the pressure in the pipe 205 has been applied, as above referred to, the piston 120 is moved upwardly, thus closing the valve 110 and the low pressure inlet into the cylinder 108, the construction of the valve 110 being such as to permit an ample flow of liquid past the same when open and so as to avoid wear on the seat for the valve 110. Thereafter the high pressure liquid produced by the low pressure converter 108 is supplied through the pipe 135 which is then modulated by the modulator valve in the casing 137 and thus delivered as modulated high pressure through the pipes 173 and 175 to the brakes so as to apply this high pressure to secure the braking effect on the brake shoes.

The modification of my invention shown in Fig. 13 is designed for providing a dual alternative control of the apparatus. This form of my invention is constructed the same as the form shown in Fig. 1, except in the following respects: In this form of my invention the pipe 135, which provides the pressure fluid to be modulated, leads to a modulator valve 209 which is constructed the same as the modulator valve 137 previously described and having a return or low pressure pipe 158 leading to the reserve tank 1. This valve, however, instead has a hand control for operating the plunger 145.

For this purpose, carried on the valve casing 211 there is a bolt 210, Fig. 14, for fastening the hand control casing 211 to the modulator valve casing 137, which casing is tightly fastened in place by ear 212 and a bolt 213 passing through the same and through a part of the casing 137. The plunger 145 is operated by a disk 214 carried in a sleeve 215 and having a rod 216 thereon extending into a spring 217, which is located within the sleeve 215. A rod 218 also extends within said spring 217 from the other end thereof and has a reduced portion 219 extending into a reduced opening at the right end of the sleeve 215. Abutting against the right end of the sleeve 215 there is a screw-piece 220 screw-threaded into a high pitch thread 221 within a screw sleeve 222 having an outside screw-thread 222a screw-threaded into the hand control casing 211. The said casing 211 has a radial pin 223 screw-threaded into the same to cooperate with a clip 224 for normally holding the hand control in open or inoperative position. This clip 224 is supported upon a boss 225 on an outer sleeve 226 by means of screws 227 and 228, the said outer sleeve 226 being fastened to the screw member 220 by means of a screw pin 229. Furthermore, the said sleeve 226 has a hexagonal end 230 onto which there is clamped a handle 231 having ears 232 and 233 through which a bolt 234 passes.

The remaining or brake control port 235 (Fig. 13) is connected by a pipe 236 to a control port in a valve seat fitting 237 of a double check valve casing 238 provided with a reciprocable cylindrical valve member 239. The opposite face of said double check valve 238 is connected by a port in a valve seat fitting 240 and a pipe 241 to another manual control, such, for example, as a treadle controlled modulator valve 242 constructed the same as the modulator valve 137, for pedal operation. This valve may have a low pressure connection 242a leading to the pipe 158 and a high pressure connection 242b leading to the pipe 135. The said double check valve thus having the two ports 237 and 240, which may be alternately closed by either one or two pilots by means of the valve member 239, is adapted thereby to deliver the modulated fluid pressure by the pipe 173 for controlling any desired part of an aeroplane.

It will be noted that the said reciprocable valve member 239 may be provided with a lateral passageway 240 (Fig. 18) to permit the passage of liquid in either direction so as to reach the outlet pipe 173, and that opposite to the latter pipe there may be a screw-plug 245 for giving access to said valve 239. Ears 246 and 247 are provided on the valve casing 238 to permit the attachment thereof to any desired part of an aeroplane.

The modification of my invention shown in Figs. 19 and 20 is designed for heavy-duty operation and may be used, for example, in connection with the operation of mine locomotives or railway cars. This modification of my invention is designed, furthermore, to modulate a regulated high pressure to produce a modulated low pressure for bringing the brakes into position preparatory to applying the braking force and thereafter to apply a modulated high pressure to said brakes for obtaining the braking force. In this form of my invention I have provided the same type of reserve tank 1 having the outlet port 5 leading to the supply pipe 6. This supply pipe 6 communicates with a spill-back tank 248 which has a vent pipe 249 leading up through the tank 1 beneath the cap 2 thereon. The vent pipe 249 opens from the top of the spill-back tank 248. The pipe 6, however, continues inwardly into the latter to communicate with the inlet side of a rotary pump 250 which may be a gear pump and which is driven by an electric motor 251. This pump 250 is connected so as to deliver, by a port, the high pressure liquid to an accumulator 253 constructed with the same parts as described in connection with the accumulator 11, in Fig. 1, and has the same circuit connections to the electric motor as there described, except that a pressure of about 1500 lbs. per sqare inch is capable of being supplied thereby. The high pressure liquid thus accumulated in the accumulator 253 is delivered by a pipe 254 from a passageway 254a therein having a check valve 254b, to a regulator valve 255 for maintaining a definite pressure, which has a valve structure exactly the same as in the valve 137 except that in this instance the plunger 145 is operated by a disk 257 (Figs. 23 and 26) having a knob 258 supported on a guide disk 259 in a spring housing 260 which has a spring 260a bearing upon the presser plate 257.

The spring housing 260 is carried in an arm 262 held by ears 263 through which a pivot 264 passes to hold it onto the valve housing 137 with the aid of a stop pin 264a cooperating with an apertured extension 264b on the arm 262. This regulator valve 255 is connected by a port 265 to the pipe 254 from which the valve receives the pressure liquid delivered by the accumulator 253. The low pressure, or exhaust liquid, leaves the valve 255 by a pipe 266 to return to the spill-back tank 248. In this valve structure the valve 152, 153 is normally closed by the spring 260a and the valve 166, 168 normally open and the compression of the spring 260a normally maintains the pressure of the liquid at a given desired pressure. When this pressure is exceeded the said two valves open and close, respectively, and the exhaust liquid passes out by the valve 152, 153. This construction produces a regulated pressure of approximately 1000 lbs. per square inch, which is delivered by the said valve 255 through a port 267 to a pipe 268 which then conveys it to a high pressure port 269 of a modulator valve 270, and which is constructed the same as the modulator valve 137 except in this instance the spring 151 and plunger 151a are omitted and inside the spring 171 there is a light spring 271a (Fig. 9) to normally keep the valve 152 open. It is to be understood, also, that this form of the manual actuator with the spring 271a can be used with the treadle 141 instead of the spring 151 and spring 151a. On the side of said modulator valve 270 the pipe 268 has a connection which conveys the high pressure liquid by a pipe 272 to the high pressure port 273 of a hand-operated modulator valve 274 provided with a discharge pipe 274a leading to the reserve tank 1, and having a handle 275 to operate the same, all of which is constructed exactly like the modulator valve 137 together with the hand control as shown in Fig. 14. This handle 275 thus enables modulated high pressure to be delivered from a port 276 thereof by a pipe 277 to a delayed-action hydraulic modulator controlling device 278 constructed like the hydraulic operating element in Fig. 10 except that there is a strong spring 201 therein which operates the said modulator valve 270 hydraulically according to the operation of the hand lever 275, but only after the brake shoes have been moved up into position. Thus, after the brakes have been moved up into braking position by a supply of modulated low pressure liquid thereto, as hereinafter described, the modulated high pressure liquid is discharged by the modulator valve 270 from a port 279 and thence by a pipe 280 to a brake operating mechanism connected to a pipe joint 281 the same as the brake operating mechanism shown in Fig. 1, to thus apply high pressure liquid for the braking effect. While the modulated high pressure liquid is thus delivered by the pipe 277 to the hydraulic element 278, a portion of this same liquid from the pipe 277, for preliminarily moving the brakes into position, passes by a pipe 282 to a hydraulic device 283 constrcted the same as the device 278 except that in this instance a light spring 201 is used, and which in turn operates a modulator valve 284 constructed the same as the modulator valves previously described, as, for instance, the modulator valve 137. In this instance the high pressure liquid to be modulated by the hydraulic element 283 is received by a pipe 285 from the other side of the accumulator 253 and is thus received in a high pressure port 286 of the modulator valve 284 from which the modulated pressure liquid is delivered by a pipe 287 to the high pressure side of a high-to-low pressure converter 288. This is comprised of a small cylinder 288a, having a normally closed air bleeder 288b, in which there is a piston 288c with a check valve 288d. The check valve 288d is in a passageway 288e leading to a low pressure large cylinder 288f, having a piston 288g, and provided with an air bleeder 288h. An air filter 288i is on the cylinder 288f, constructed like the air filter 128. The said modulator valve 284 is provided with a discharge or exhaust port 288j leading back to the spill-back tank 248. The low pressure side of the said low pressure converter 288 is connected by a pipe 289 to a low pressure port 290 in the modulator valve 270. This low pressure supplied through the port 290, due to the strong spring 201 keeping the valve 152 open in the initial operation of the brakes, permits the low pressure fluid to pass between the valve 152 and its seat and thence to the pipe 280 for the movement of the brake shoes up to the braking position. When the pressure in the pipe 280 has been applied to such an extent as to move the brake shoes into position, the increase in pressure within the pipe 277 will seat the valve 152 in the modulator valve 270 to permit the entry of high pressure liquid by the valve 167, thus supplying the high pressure liquid through the pipe 280 to apply the braking effect as previously described. The exhaust flow of liquid from the modulator valve 270 is received in the pipe 289. In this way a relatively high pressure may be used for applying a comparatively low pressure for the initial setting of the brakes, as, for instance, on mine locomotives or railway cars, while high pressure liquid is applied thereafter to the brakes to obtain the desired braking force.

In the form of my invention as shown in Figs. 21 and 22 I have provided a similar system for controlling the operation of the parts of automotive vehicles and which is designed for installation on units involving heavy duty. In this instance means is provided for initially moving the parts into position by merely a manual force applied hydraulically after whih a high pressure liquid is brought into action thereby to apply the braking force. In this instance a foot pedal 291 is pressed to the left in Fig. 21 to operate a rod 292 attached to a piston 293 in a master cylinder 294 having an inlet port 295 for liquid from a supply tank 296. The forward movement to the left, in Fig. 21, of the piston 293 will force the liquid out of the cylinder 294 into a pipe 297 and thence to a pipe 298 into a low pressure port 299 on a hydraulic operating unit and modulator valve 300, which is constructed the same as the modulator valve 270, so that the liquid initially passes from the pipe 298 by the valve 152 through the tubular valve 154 and thence to a port 301 and a pipe 302 to a brake-operating cylinder 303 for moving the brake shoes 304 and 305 into position. This movement of the liquid under manual pressure will continue until the brake shoes 304 and 305 are moved entirely into position, after which the pressure in the pipe 302 will increase to such an extent that the liquid from the pipe 297 will operate a hydraulic unit 306 which is constructed the same as the hydraulic unit 270, and thereby operate the tubular valve in the modulator valve 300 so as to cut off the entry of liquid from the pipe 298 while modulated high pressure liquid is thereafter delivered by the tubular valve to the pipe 302 and thence to the brakes to apply the braking force thereto. This high pressure liquid is delivered to the modulator valve 300 through a port 307 from a pipe 308 and is supplied to said pipe from a port 309 in a regulator pressure valve 310, constructed the same as the regulator pressure valve 255. The exhaust or low pressure from the regulator valve 310 passes out by a low pressure port 311 to a tank 312. Furthermore, the high pressure liquid is supplied to said regulator valve 310 by a port 313 from a check valve controlled port 314 which is connected to the discharge side of an accumulator 315 constructed the same as the accumulator 11 previously described, and the liquid under pressure is supplied to said accumulator 315 by means of a rotary pump 316 located in the tank 312 and driven by an electric motor 317, the said motor and pump being constructed and arranged the same as the motor 251 and the pump 250 in Fig. 20. The same type of electric circuit is used thereon as previously described. In the return movement of the pedal 291, means is provided for unloading the manual pressure liquid in the pipe 297 quickly, to provide uniformity of action at all times, by means of a branch pipe 318 which is connected to an unloader valve casing 319 the valve in which is opened automatically by a bell crank lever 320 pivoted on ears 321 on the valve casing 319, the lower end of the bell crank lever 320 being connected by a cable 322 to an arm 323 held in place by nuts 324 on the rod 292. The unloader valve within the casing 319 is comprised of a fitting 325 (Fig. 22) communicating with the pipe 318, which fitting is screw-threaded in the casing 319. The said fitting 325 supports a spring 326 to hold upwardly a valve 327 against a seat 328 within said casing 319. A chamber 329 is provided, in which the valve 327 moves and when the said valve is unseated it communicates with a chamber 330 leading by a passageway 331 to a port 332 and a pipe 333 fastened to a fitting 334 which communicates with the upper portion of the tank 296. A filler cap 335 is also provided on the top of said tank 296. By this means, when the foot is taken off the pedal 291 the liquid in the pipe 297 is automatically unloaded quickly into the tank 296.

In the operation of my invention as shown in Fig. 1, when it is desired to put on the brakes or operate any other part of the automotive vehicle the pedal 141 is moved downwardly and the relatively low pressure liquid received through the port 136, due to the closure of the valve 152, is allowed to pass by the valve 167 in modulated amounts, thence through the port 169 and out through the port 165 to the pipes 173 and 175 and then to the brakes to initially move the brake shoes into position. When the pressure in these pipes accumulates to a higher pressure, this pressure reacts through the pipe 193 on to the converter valve 204 to keep the said valve open while this high pressure condition continues, the result of which is to cause the low pressure liquid received by said valve 204 from the pipe 105 to pass by the pipe 205 to the low-to-high pressure or large cylinder end of the low pressure converter 108, thereby closing the valve 110 and placing the liquid under high pressure in the cylinder 115, which is then discharged by the pipe 135 to be modulated by the modulator valve 137 and thence delivered in the form of high pressure by the pipes 173 and 175 to the brake shoes for producing the braking effect thereon. This braking pressure can be modulated, that is to say increased or decreased at will, according to the increments or partial release of the liquid in the pipes 173 and 175 by the valve 137. Upon the release of the pedal 141 the parts are restored to their initial positions, the exhaust liquid passing by the pipe 158 to the reserve tank 1 and from the valve 204 by the pipe 207 to the low pressure side of the pump 7. Throughout the operation, as described above, the accumulator 11 will maintain therein a body of liquid under the minimum desired pressure, which may be approximately 1000 lbs. per square inch, ready to be utilized whenever desired upon the actuation of the pedal 141. By this means a relatively low pressure is provided for initially setting the brakes, followed by modulated high pressure for applying the braking force. Also, if desired, the brakes can be operated by the manual force through the continuous body of the hydraulic fluid to the brakes in case of failure of the other liquid pressures.

In the form of my invention shown in Fig. 13, the operation of the parts is the same as in Fig. 1 except in this instance a dual alternative control is provided, which is, for example, very useful in connection with aeroplanes. In this instance, in other words, the hand-controlled modulator valve 209 or the pedal controlled modulator valve 242 may be utilized, as, for example, by either one of two pilots operating the aeroplane. According to which one of these manual controls is being used, the double check valve 239 will automatically be moved to permit the operation from either of said controls.

In the form of my invention shown in Figs. 19 and 20, there is utilized a relatively high pressure which initially brings a relatively low pressure into action for setting the brakes into position, after which a modulated high pressure is applied for applying the braking force. In this instance, when the hand control modulator valve 274 is operated the high pressure liquid received by said valve from the pipe 272 is applied through the pipe 282 to the light spring hydraulic control 283 so as to modulatingly release the high pressure fluid received from the pipe 285 through the pipe 287 to the high pressure end of the high-to-low pressure converter 238 so as to thereby force out of the low pressure side of the same, through the pipe 289, a low pressure liquid which passes directly through the modulator valve 270 because the valve 152 is kept open at this stage by the strong spring control 278, 201 this low pressure liquid being thus delivered by the pipe 280 to the brakes to move the brake shoes initially into position. As the pressure applied increases in the pipe 277 this brings about no increased action on the part of the control 283 btu acts to overcome the strong spring 201 in the control 278, thus closing the valve 152 and opening the valve 167 in the modulator valve 270, and thus supplying a modulated high pressure liquid through the pipe 280 to apply the braking force on the brake shoes. In this way any desired increments of increasing pressure, initially low and thereafter high pressure, can be applied for the operation of the brakes. In the off modulation of the valve 270 the liquid flows in the reverse direction in the pipe 289, and from the modulator valve 274 back to the reserve tank 1 through the pipe 274a and from the modulator valve 284 through the pipe 288j back to the spill-back tank 248.

In the form of my invention shown in Fig. 21, manual pressure is utilized for bringing the brake shoes into position, after which a high pressure is brought into action for applying the braking force to the brakes. For this purpose, when the foot pedal 291 is manually operated the piston 293 traps some of the liquid received from the port 295 and then forces the same through the pipe 297 and the pipe 298 past the open valve 152 and through the pipe 302 to move the brake shoes 304 and 305 into position. As the pressure of this liquid increases, the hydraulic unit 306 is operated to close the valve 152, thus unseating the valve 167 and admitting high pressure liquid received from the accumulator 315 to the pipe 302 for applying the force of the high pressure liquid so as to obtain the desired braking effect upon the braking shoes. This high pressure liquid, by means of the valve 152 in the desired increments, enables the modulated pressure to be utilized in the on or off modulation so as to obtain a carefully and exactly modulated braking effect, that is to say a braking effect which is accurately coordinated to the manual force applied to the manual actuating means, the same as in the case of the other forms of my invention above described. Upon the release of the manual pressure the liquid flows in the reverse direction through the pipes 302, 298 and 297, and, due to the unloader valve 319, is discharged quickly through the passageway 332 into the supply tank 296 ready to be used again in the same way when the manual force is again applied to the pedal 291. This unloader valve is quite similar in operation to the low-to-high pressure converter valve operation 110, especially because of the lost-motion connection to said valves.

While I have described my invention above in detail I wish it to be understood that many changes may be made therein without departing from the spirit of the same.

I claim:

1. In combination, hydraulic means, including a pressure-reactive hydraulically operating valve, adapted to exert a pressure varying at will for the actuation of a part by a hydraulic pressure liquid, means, including an accumulator-reservoir having an intermittently operating charging means controlled by the pressure from the accumulator, for supplying said hydraulic liquid under a substantially constant predetermined superatmospheric pressure to said hydraulic means, a high-to-low pressure converter means operated by pressure liquid controlled by the operating valve, said converter including a plunger through which pressure liquid is released, and a valve, acting by means of the pressure of said first mentioned hydraulic pressure liquid conveyed from the first mentioned valve to operate the converter, so constructed as to control the exertion of another pressure on said part through said supplied hydraulic liquid upon the application of pressure to the second mentioned valve.

2. In combination, hydraulic means, including a manually movable pressure-reactive hydraulically operating modulating valve, adapted to exert a pressure varying at will for the actuation of a part by a hydraulic pressure liquid, means, including an accumulator-reservoir having an intermittently operating charging means controlled by the pressure from the accumulator, for supplying said hydraulic liquid under a substantially constant predetermined superatmospheric pressure to said hydraulic means, and a high-to-low pressure converter means operated by pressure liquid controlled by the operating valve, said converter including a plunger through which pressure liquid is released, and a valve, acting by means of the pressure of said first mentioned hydraulic pressure liquid conveyed from the first mentioned valve to operate the converter, so constructed as to control the exertion of another pressure on said part through said supplied hydraulic liquid upon the application of pressure to the second mentioned valve by the manual modulation of said supplied pressure liquid.

3. In combination, hydraulic means, including a pressure-reactive hydraulically operating valve, adapted to exert a pressure varying at will for the actuation of a part by a hydraulic pressure liquid, means, including an accumulator-reservoir having an intermittently operating charging means controlled by the pressure from the accumulator, for supplying said hydraulic liquid under a predetermined superatmospheric pressure to said hydraulic means, and a high-to-low pressure-converter means operated by pressure liquid controlled by the operating valve, said converter including a plunger through which pressure liquid is released, and a valve, acting by means of the pressure of said first mentioned hydraulic pressure liquid conveyed from the first mentioned valve to operate the converter, so constructed as to control the exertion of another higher pressure on said part through said supplied hydraulic liquid.

4. In combination, hydraulic means, including a manually movable pressure-reactive hydraulically operating modulating valve, adapted to exert a pressure varying at will for the actuation of a part by a hydraulic pressure liquid, means, including an accumulator-reservoir having an intermittently operating charging means controlled by the pressure from the accumulator, for supplying said hydraulic liquid under a predetermined superatmospheric pressure to said hydraulic means, and a high-to-low pressure-converter means operated by pressure liquid controlled by the operating valve, said converter including a plunger through which pressure liquid is released, and a valve, acting by means of the pressure of said first mentioned hydraulic pressure liquid conveyed from the first mentioned valve to operate the converter, so constructed as to control the exertion of another higher pressure on said part through said supplied hydraulic liquid by the manual modulation of said supplied pressure liquid.

5. In combination, hydraulic means including a pressure-reactive hydraulically operating valve adapted to exert a pressure varying at will for the actuation of a part by a hydraulic pressure liquid, means, including an accumulator, for supplying said hydraulic liquid under a substantially constant predetermined superatmospheric pressure to said hydraulic means, and operating means, including a valve device through which operating means the liquid from the first mentioned valve is adapted to pass and a high-to-low pressure converter receiving liquid controlled from the first mentioned valve, having a piston through which pressure liquid is released, said operating means acting by means of the pressure in the converter, and being so constructed as to exert another pressure on said part through the hydraulic liquid from said second valve device.

6. In combination, manual hydraulic means including a pressure-reactive hydraulically operating valve adapted to exert a pressure varying at will for the actuation of a part by a hydraulic pressure liquid, means, including an accumulator, for supplying said hydraulic liquid under a substantially constant predetermined superatmospheric pressure to said hydraulic means, and operating means, including a valve device through which operating means the liquid from the first mentioned valve is adapted to pass, and a high-to-low pressure converter receiving liquid controlled from the first mentioned valve, having a piston and valve through which pressure liquid is released, said operating means acting by means of the pressure in the converter, and being so constructed as to exert another pressure on said part through the hydraulic liquid by the manual modulation of the pressure liquid from said second valve device.

7. In combination, hydraulic means, including a pressure-reactive hydraulically operating manually controlled modulating valve adapted to produce one pressure for moving an automotive vehicle brake by a hydraulic pressure liquid, means for supplying said hydraulic liquid under a substantially uniform superatmospheric pressure to said hydraulic means, and a high-to-low pressure converter means having a piston through which pressure liquid is released and operating means including a valve device through which operating means the liquid from the first mentioned valve is adapted to pass, and being so constructed as to exert another pressure on said automotive vehicle brake upon the application of pressure to the second mentioned valve device.

8. In combination, an accumulator for accumulating a hydraulic pressure liquid under a superatmospheric pressure, a high to low pressure transformer supplied with pressure liquid therefrom, a valve for modulating said accumulated hydraulic liquid to the transformer, which is transformed to a lower-pressure liquid therefrom for moving a part by the latter, and a valve operated by an increase of the pressure in said supplied liquid to produce another movement of said part by the modulation of said accumulated hydraulic liquid, said last mentioned valve having its liquid release passing through said transformer to the accumulator.

9. In combination, an accumulator for accumulating a hydraulic pressure liquid under a substantially uniform superatmospheric pressure, a high to low pressure transformer supplied with pressure liquid therefrom, a manually controlled valve for modulating said accumulated hydraulic liquid to the transformer, which is transformed to a lower-pressure liquid therefrom for moving a part by the latter, and a valve operated by an increase of the pressure in said supplied liquid to produce another movement of said part by the modulation of said accumulated hydraulic liquid, said last mentioned valve having its liquid release passing through said transformer to the accumulator.

10. In combination, a reservoir, an accumulator for accumulating from the reservoir a hydraulic pressure liquid under a superatmospheric pressure, a high to low pressure transformer supplied with pressure liquid therefrom, a valve for modulating said accumulated hydraulic liquid to the transformer, which is transformed to a lower-pressure liquid therefrom for moving a part by the latter, and a valve operated by an increase of the pressure in said supplied liquid to produce another movement of said part by modulating said accumulated hydraulic liquid, said last mentioned valve having its liquid release passing through said transformer to the first mentioned valve back to the reservoir.

11. In combination, a reservoir, an accumulator for accumulating from the reservoir a hydraulic pressure liquid under a substantially uniform superatmospheric pressure, a high to low pressure transformer supplied with pressure liquid therefrom, a manually controlled valve for modulating said accumulated hydraulic liquid to the transformer, which is transformed to a lower-pressure liquid therefrom for moving a part by the latter, and a valve operated by an increase of the pressure in said supplied liquid to produce another movement of said part by modulating said accumulated hydraulic liquid, said last mentioned valve having its liquid release passing through said transformer to the first mentioned valve back to the reservoir.

12. In combination, an accumulator for accumulating a hydraulic pressure liquid under a superatmospheric pressure, a high to low pressure transformer supplied with pressure liquid therefrom, a valve for modulating said accumulated hydraulic liquid to the transformer, which is transformed to a lower-pressure liquid therefrom for moving a brake motor by the latter, a valve operated by an increase of the pressure in said supplied liquid to produce another movement of said brake motor by the modulation of said accumulated hydraulic liquid, said last mentioned valve having the liquid release passing through said transformer to the first mentioned valve, and hydraulic connections leading to the accumulator, between the accumulator and the transformer and from the last mentioned valve to said brake motor.

13. In combination, an accumulator for accumulating a hydraulic pressure liquid under a substantially uniform superatmospheric pressure, a high to low pressure transformer supplied with pressure liquid therefrom, a manually controlled valve for modulating said accumulated hydraulic liquid to the transformer, which is transformed to a lower-pressure liquid therefrom for moving a brake motor by the latter, a valve operated by an increase of the pressure in said supplied liquid to produce another movement of said brake motor by the modulation of said accumulated hydraulic liquid, said last mentioned valve having the liquid release passing through said transformer to the first mentioned valve, and hydraulic connections leading to the accumulator, between the accumulator and the transformer and from the last mentioned valve to said brake motor.

EDWARD A. ROCKWELL.